United States Patent [19]

Brilmyer

[11] Patent Number: 5,396,162
[45] Date of Patent: Mar. 7, 1995

[54] PORTABLE BATTERY CHARGER

[76] Inventor: George Brilmyer, 322 Cheviot Pl., Cortland, Ohio 44410

[21] Appl. No.: 70,897

[22] Filed: Jun. 3, 1993

[51] Int. Cl.⁶ .................. H01M 10/44; H01M 10/46
[52] U.S. Cl. ...................................................... 320/2
[58] Field of Search ..................................... 320/2, 13

[56] References Cited

U.S. PATENT DOCUMENTS

| | | | |
|---|---|---|---|
| 3,629,680 | 12/1971 | Baynes et al. | 320/2 |
| 3,749,905 | 7/1973 | Friedman et al. | 320/3 X |
| 3,757,194 | 9/1973 | Weber et al. | 320/2 |
| 4,084,123 | 4/1978 | Lineback | 320/2 |
| 4,540,929 | 9/1985 | Binkley | 320/2 |
| 4,670,700 | 6/1987 | Henkel | 320/2 |
| 4,692,680 | 9/1987 | Sherer | 320/2 |
| 4,829,224 | 5/1989 | Gandelman et al. | 320/2 |
| 4,831,321 | 5/1989 | Cooper | 320/2 X |
| 4,965,462 | 10/1990 | Crawford | 320/2 X |
| 5,153,495 | 10/1992 | Connors | 320/2 |

OTHER PUBLICATIONS

"Sony" Operating Manual for Stereo Cassette-Corder WM-D 6, pp. 2, 3, 9 & 12, 1982.
Photo Copy of Plastic Battery Holder (4-"C" Type) with Sony-Type Plug-1985.
Video Review-"Scotch" (3M) Advertisement Showing Duracell Alkaline Battery Pack, Oct. 1991.
Herrington Catalog, Winter, 1988 "Spare Battery for Cars and Boats".

Primary Examiner—Steven L. Stephan
Assistant Examiner—E. To
Attorney, Agent, or Firm—Harpman & Harpman

[57] ABSTRACT

A portable battery charger for rechargeable battery powered appliances, tools, toys or the like. The portable battery charger includes, a portable direct current power source, a housing designed to contain said direct current power source, and said housing including a means for parallel electrical interconnection of said portable direct current power source to the direct current power system of the battery powered appliance. The portable direct current power source is comprised of an assembly of primary battery cells and has a nominal DC voltage which approximates that of the charging voltage of the rechargeable battery of the battery powered appliance. The portable battery charger is designed with sufficient power so as to supply power to recharge the rechargeable battery of the battery powered appliance while simultaneously operating the appliance. The dual charging-operating function of the portable battery charger, eliminates the need for a delay in operation time of the appliance when the rechargeable battery of the appliance is in need of recharge. The primary batteries used in the portable battery charger (ie alkaline batteries) are also easily replaceable thus further extending the usefulness of the device.

2 Claims, 2 Drawing Sheets

PORTABLE BATTERY CHARGER

FIELD OF THE INVENTION

The present invention relates to a portable battery charging apparatus for recharging battery powered appliances, tools, toys or the like, without the need for an AC power source.

BACKGROUND OF THE INVENTION

A common problem with battery powered appliances., tools or toys that operate on rechargeable battery packs is that the battery pack tends to reach a discharged condition when the device is in use. If the battery is internal to the appliance, use of the appliance must be discontinued while the battery is recharged via a conventional AC/DC battery charger. In the case of a battery powered appliance such as a home video camera, a delay in operational time often results in the irreversible loss of opportunity. This problem has been addressed by the manufacturers of battery powered appliances, such as garden tools, in some instances, by supplying a removable battery pack (U.S. Pat. Nos. 3,757,194 and 4,084,123). In this way the discharged battery pack may be replaced with a fully charged battery pack enabling the device to be operated for an additional period of time.

There are still several problems associated with the use of a secondary battery pack. The first problem relates to the significant expense associated with the purchase of the second battery pack. An additional problem is that the second battery pack is, in many instances, rarely utilized because it can only be used with the specific appliance for which it was purchased. It is for the lack of use that a second battery pack is rarely purchased. Another problem associated with a second rechargeable battery pack relates to the fact that, the second battery pack must have been thoroughly recharged within a suitable period of time, because of the tendency of rechargeable batteries to "self-discharge" during storage. For example, a fully recharged battery pack of a nickel-cadmium design, will lose approximately 1% of its nominal charge per day if stored at room temperature, ie 77 degrees Fahrenheit.

The final problem occurs when indeed the second battery pack is found to be fully charged, ready for service, and is used to operate the appliance. Ultimately, the second battery pack becomes fully discharged and the entire discharged battery pack scenario reoccurs. Accordingly, there is a need for a cost effective, portable battery charging device. This charging device must be relatively insensitive to long periods of storage, handle multiple charge/recharge cycles and possibly enable the appliance to be operated somewhat indefinitely, without the need for major delays for battery recharging.

In the past, the toy industry has addressed the issue of the charging of self-contained batteries without the need for an AC power source. In U.S. Pat. No. 3,629,680 a portable battery charger is described for a nickel-cadmium battery powered toy car. The portable charger in the form of an automotive service station gasoline pump, contains a "charging battery" and a charger cable which resembles the fuel pump nozzle. To operate, the pump nozzle is inserted into the "gas tank" of the toy car and a button depressed to release the "fuel". In this manner, the rechargeable battery of the toy car is recharged using an assembly of batteries with no need of an AC charger. The disadvantage of the "fuel pump" charger is that it requires that the toy vehicle remain completely immobile until the batteries of the toy vehicle are sufficiently recharged.

The concept of utilizing batteries to recharge other batteries has also been employed in other aspects of the battery industry. In U.S. Pat. No. 4,692,680 a series of dry cells in a package is effective as a portable boost charging device for automotive lead-acid batteries and U.S. Pat. No. 4,875,820 describes a device that uses sealed lead-acid batteries in an electronic package to recharge an automotive starting battery. This prior work shows that charge may be effectively transferred from one battery to another, but in these examples, is limited to use with electronic circuitry as a short term power boost. Finally, U.S. Pat. No. 4,670,700 indicates that nickel-cadmium batteries have been shown to be rechargeable with the use of an automotive lead acid battery. This particular technology would not be practical for use with battery powered appliances, tools or toys, due to the delay in operational time required for the recharging process.

SUMMARY OF THE INVENTION

The present invention is a convenient and cost effective portable battery charger which addresses the foregoing factors by utilizing an assembly of primary battery cells to recharge the rechargeable battery of a battery powered appliance and to also simultaneously operate the appliance. A portable battery charger includes a portable direct current power source, a housing containing said direct current power source removably affixable to the battery powered appliance and including a means for parallel electrical interconnection of said portable direct current power source to the direct current power system of the battery powered appliance. The portable direct current power source is comprised of an assembly of alkaline battery cells and has a nominal DC voltage which approximates that of the charging voltage of the rechargeable battery of the appliance. The housing is designed to mechanically attach to the appliance while the rechargeable battery pack of the appliance remains in place. The housing also contains the required external electrical connectors or spring loaded contacts to facilitate parallel electrical interconnection of the portable direct current power source to the DC power source of the appliance. The appliance must have been suitably designed for direct electrical access to the direct current power system of the rechargeable battery pack. For example, the rechargeable battery pack of the appliance may be equipped with two exposed DC terminal pads, thereby permitting the spring loaded contacts of the portable battery charger to come into contact when attached. In this manner, the nominal voltage of the portable battery charger may be properly applied in parallel to the rechargeable battery pack during operation. Therefore when the housing of the portable battery charger is attached to the appliance, the portable battery charger supplies the power necessary to recharge the battery and sufficient power to simultaneously operate the appliance.

The portable battery charger utilizes a series of primary battery cells, such as alkaline batteries, as the direct current power source. These primary batteries may be stored within the portable battery charger or purchased only when required. The housing of the portable battery charger is designed for easy access to the primary batteries. The nominal voltage of the portable battery charger and thus the number of primary cells required is a function of the charging voltage of the rechargeable battery pack of the battery powered appliance and the power requirements of the appliance. In all instances, the nominal voltage of the portable direct current power source is typically equivalent to that of the charging voltage of the rechargeable battery pack. In this manner, the portable direct current power source will supply power to, and in effect, recharge the rechargeable battery of the battery powered appliance when the two devices are electrically interconnected in parallel. The circuitry of the portable battery charger may contain a current limiting resistor to prevent excessive current flow and a diode to prevent a reverse charging condition.

In different applications, the housing of the portable battery charger may take on different shapes and characteristics. For example, for a portable video camera application, the portable battery charger may have a sleek, unobtrusive design and may be molded from impact resistance ABS plastic. The device can attach on the rear of the camera, "piggy backing" on the main camera battery to make the required electrical contact.

DESCRIPTION OF THE PREFERRED EMBODIMENT

Figure 1:
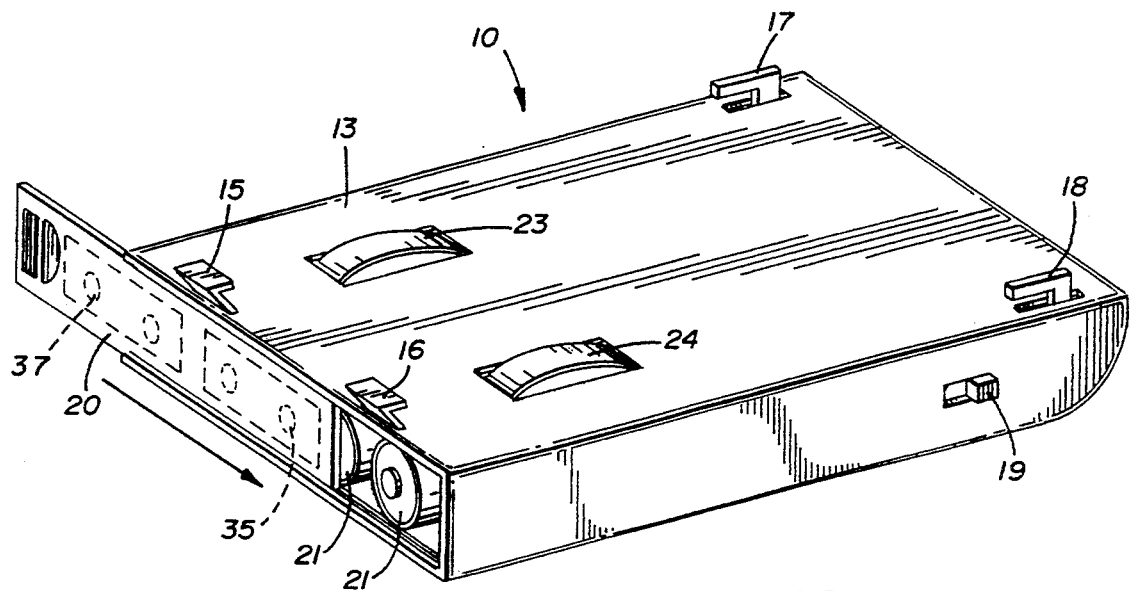
FIG. 1 is a perspective view of the preferred embodiment of the invention as it is used to charge the battery of a battery powered appliance.
Figure 2:
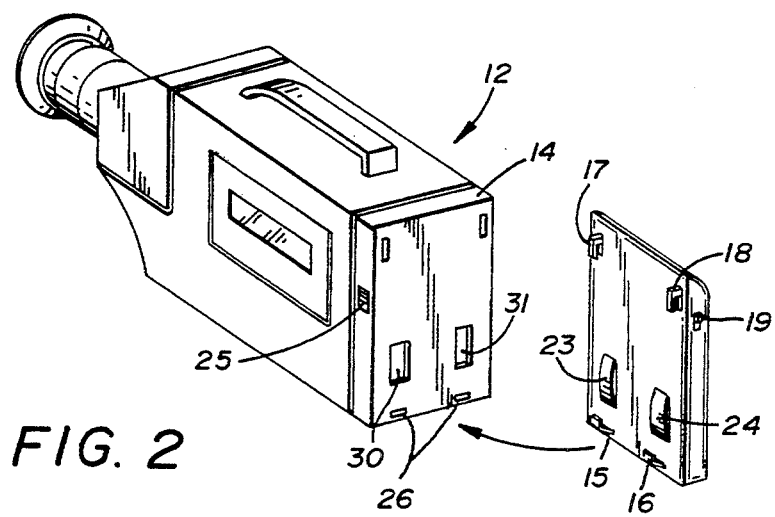
FIG. 2 is a perspective view of the battery powered appliance and the associated rechargeable battery pack which has been adapted to accept the use of a portable battery charger.

Referring to FIGS. 1 and 2 of the drawings, there is shown a portable battery charger 10 in the form designated for attachment to an appliance such as a portable video camera 12. A plastic housing 13 is designed for attachment to the rear of the video camera 12 directly in contact with a rechargeable camera battery pack 14. Mounting brackets 15, 16 and 17 and 18 are designed for rapid attachment and detachment directly onto the rear of the camera battery pack 14. The lower brackets 15 and 16 are rigid and immobile. The upper brackets 17 and 18 are movable and are attached to a release mechanism 19 for removing the portable battery charger from the camera battery pack 14. The housing 13 is equipped with a sliding compartment cover 20 at the bottom through which primary batteries 21 are introduced. The primary batteries 21 are preferably alkaline cells, but can be of other chemistries such as standard carbon zinc or heavy duty carbon zinc as will be well known and understood by those skilled in the art.

Internal to the portable battery charger 10 are electrical contacts and shunts through which the primary batteries 21 are connected in series as will be described in greater detail later.

Electrical contact is made from the portable battery charger 10 to the rechargeable camera battery pack 14 via two external electrical contacts 23 and 24. These external electrical contacts 23 and 24 are preferably formed from nickel plated steel strip or tin plated brass alloy and are spring loaded to produce the proper contact force to exposed contact pads 30 and 31 of the rechargeable battery pack 14.

Referring to FIG. 2 of the drawings the rechargeable battery pack 14 is of a standard nickel-cadmium design, has a nominal voltage of 12 VDC and is removably affixed to the video camera 12 with the use of a slide mounted lever 25 as will be well known and understood by those skilled in the art. The rechargeable battery pack 14 has been modified to accommodate the portable battery charger 10 of the invention. The rechargeable battery pack 14 is equipped with attachment brackets 26 which are designed to accept and support the portable battery charger 10. The electrical contact pads 30 and 31 have been designed on the external surface of the camera battery pack 14 to make the proper electrical contact with the spring loaded external electrical contacts 23 and 24 of the portable battery charger 10 as hereinbefore described. The electrical contact pads 30 and 31 are recessed into the rechargeable battery pack 14 for electrical safety.

Figure 4:
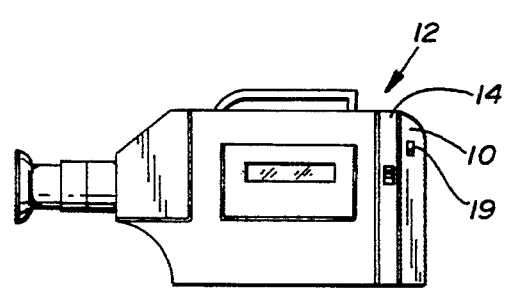
FIG. 4 is a perspective view of the battery powered appliance with a portable battery charger secured thereon.

With reference to FIG. 4 of the drawings, there is shown the portable video camera 12 with the portable battery charger 10 fully attached to the rechargeable camera battery pack 14 in such a way so as not to obstruct usage of the camera in a normal manner. In the fully attached position, the external electrical contacts 23 and 24 of the portable battery charger 10 are in direct electrical contact with the electrical contact pads 30 and 31 of the camera battery pack 14. The portable battery charger 10 can be removed with use of a quick release mechanism 19 which detaches the portable battery charger 10 without interruption of operation.

Figure 3:
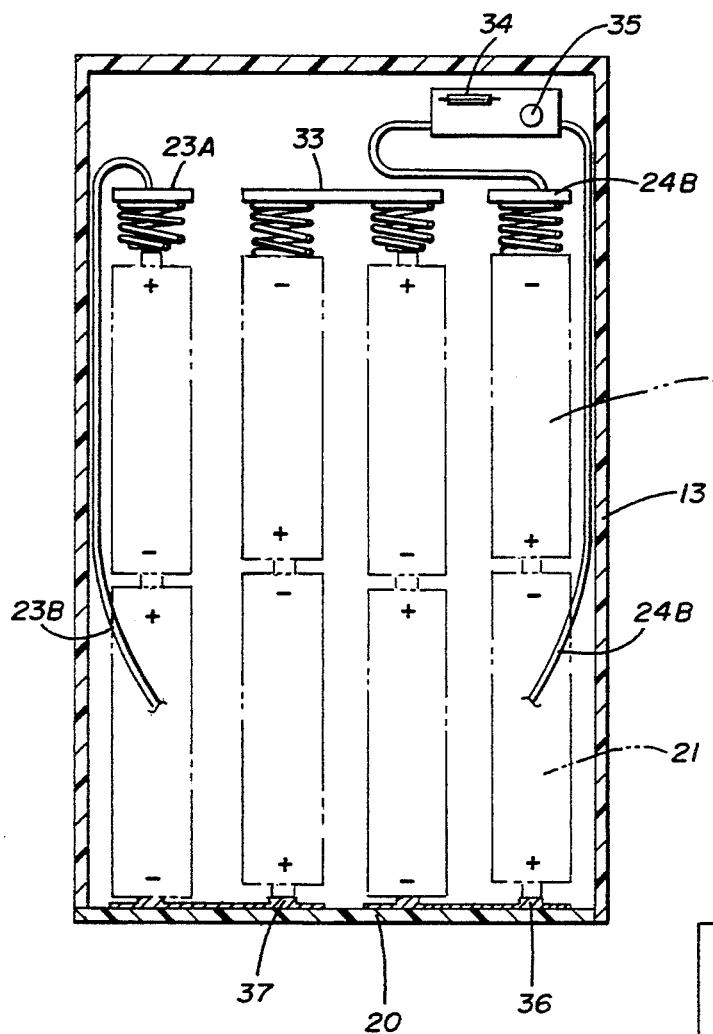
FIG. 3 is a cut-a-way view of the portable battery charger.
Figure 5:
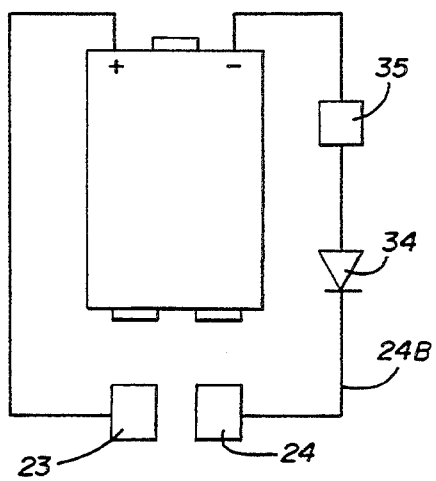
FIG. 5 is a schematic illustration of the electrical circuit of the portable battery charger.

With reference to FIG. 3 of the drawings, there is shown a cut-a-way view of the portable battery charger 10. The plastic housing 13 of the portable battery charger 10 is designed to support the primary batteries 21 shown in broken lines in electrical series arrangement. The housing 13 is equipped with a built-in series connector 33 and a current limiting resistor 34 and a current reversal protection diode 35. The external electrical contacts 23 and 24, not shown, are electrically wired to each end of spring mounted battery contacts 23A and 24A via wires 23B and 24B. The sliding compartment cover 20 is equipped with two electrical connectors 36 and 37 to complete the series electrical connection of the primary batteries 21 forming a direct current power source.

EXAMPLE 1

To demonstrate the principle, the video camera 12 was operated continuously for a period of approximately one hour at which time the rechargeable battery was fully discharged and the camera automatically turned itself off. The camera was then permitted to remain undisturbed for more than one hour. The open circuit voltage of the rechargeable camera battery pack 14 was measured to be 12.0 volts. Multiple attempts to operate the video camera in this condition were unsuccessful, due to the discharged condition of the rechargeable battery pack 14. At this time the portable battery charger 10 was attached to the rear of the rechargeable battery pack 14 and operation of the video camera attempted within five seconds. The video camera was now found to be fully operational and was operated for a 30 minute period without interruption. After the 30 minute period, the portable battery charger 10 was removed and the video camera 12 continued to operate. The voltage of the rechargeable battery pack 10 (during operation) was measured to be 12.3 volts and the video camera continued to operate for more than one hour. For a second time, the portable battery charger 10 was placed in the charging position and the camera was operated for an additional 30 minutes until the charger was again removed. The video camera operation continued unaided for an additional 30 minutes until operation was discontinued.

Thus, it will be seen that a new and useful portable battery charger has been illustrated and described and it will be apparent to those skilled in the art that various changes and modifications may be made therein without departing from the spirit of the invention, therefore I claim:

1. A portable self-contained battery charger and power source in combination, for a rechargeable battery powered appliance having a direct current power system of a known voltage requirement, said self-contained battery charger and power source comprising; a portable direct current power source comprising an assembly of primary alkaline batteries of a voltage output greater than that of said known voltage requirement of said powered appliance, a housing containing said direct current power source selectively affixed to the battery powered appliance, said housing including at least one fixed bracket and at least one movable bracket on said housing in spaced relation to one another and a pair of external electrical contact positioned therebetween, said external electrical contacts registerable with electrical contact pads on said rechargeable battery powered appliance, said portable direct current power source having an internal limiting device and means for preventing reverse charging of said direct current power source.

2. The portable battery charge of claim 1 wherein said means for preventing reverse charging is a diode.

* * * * *